United States Patent [19]

Rogers

[11] Patent Number: 4,495,423
[45] Date of Patent: Jan. 22, 1985

[54] WIND ENERGY CONVERSION SYSTEM

[75] Inventor: Ernest E. Rogers, Lake Geneva, Wis.

[73] Assignee: Felt Products Mfg. Co., Skokie, Ill.

[21] Appl. No.: 300,731

[22] Filed: Sep. 10, 1981

[51] Int. Cl.³ .............................................. F03D 7/02
[52] U.S. Cl. ...................................... 290/44; 220/55; 416/43; 416/89
[58] Field of Search ................ 416/89 A, 52 A, 43 A; 290/44, 55

[56] References Cited

U.S. PATENT DOCUMENTS

| | | | |
|---|---|---|---|
| 1,533,467 | 4/1925 | Sargent | 416/89 A |
| 1,986,752 | 1/1935 | Rorvik | 416/89 A |
| 2,029,503 | 2/1936 | Peterson | 416/89 A |
| 2,052,454 | 8/1936 | Elwood et al. | 416/89 A |
| 2,117,788 | 5/1938 | Cable et al. | 416/89 A |
| 2,516,576 | 7/1950 | Jacobs . | |
| 3,154,150 | 10/1964 | Dhonau | 416/43 A |
| 4,257,736 | 3/1981 | Jacobs | 416/89 A |
| 4,333,018 | 6/1982 | Bottrell . | |
| 4,349,315 | 9/1982 | Ducker | 416/43 A |
| 4,374,631 | 2/1983 | Barnes . | |

FOREIGN PATENT DOCUMENTS

| | | | |
|---|---|---|---|
| 27187 | 6/1931 | Australia | 416/89 A |
| 15495 | 12/1971 | Australia . | |
| 17763 | 4/1882 | Fed. Rep. of Germany . | |
| 658524 | 4/1938 | Fed. Rep. of Germany . | |
| 837230 | 12/1948 | Fed. Rep. of Germany . | |
| 964695 | 8/1950 | France . | |
| 230132 | 12/1943 | Switzerland . | |

OTHER PUBLICATIONS

Jayadev, Windmills Stage a Comeback, 11-1976, IEEE Spectrum.

Primary Examiner—J. V. Truhe
Assistant Examiner—Shelley Wade
Attorney, Agent, or Firm—Dressler, Goldsmith, Shore, Sutker & Milnamow, Ltd.

[57] ABSTRACT

A wind powered device on a support structure is provided with a drive shaft mounted for rotation about its axis on the support structure and is coupled to an electric generator connected to a utility power grid.

A rotor is mounted on the support structure and is adapted to drive the shaft, hence the electric generator. The rotor has at least one rotor blade. The rotor is mounted to drive the shaft and also for limited relative rotational movement with respect to the drive shaft about the axis of the drive shaft as the wind velocity driving the rotor changes. The coupling between the shaft and rotor responds to increases and decreases in rotor torque so that as imbalances between shaft torque and rotor torque arise, the rotor tends to run ahead of or behind the shaft. That causes rotation of the rotor relative to the drive shaft and the coupling means sense that change and automatically increase or decrease blade pitch via the automatically responsive mechanical coupling means to tend to bring shaft torque and rotor torque back into balance. Desirably the shaft is governed by a speed regulator, such as a generator connected to a utility power grid, so that it will rotate up to a predetermined speed or speeds beyond which shaft torque tends to increase sharply, so that if the speed of rotation of the rotor increases to a point at which it tends to exceed maximum permitted shaft torque, the blades are automatically increased in pitch which then decreases rotor speed, hence rotor torque.

Several embodiments for automatically mechanically adjusting blade pitch in response to changes in rotor torque and imbalances in rotor and shaft torque are disclosed.

45 Claims, 11 Drawing Figures

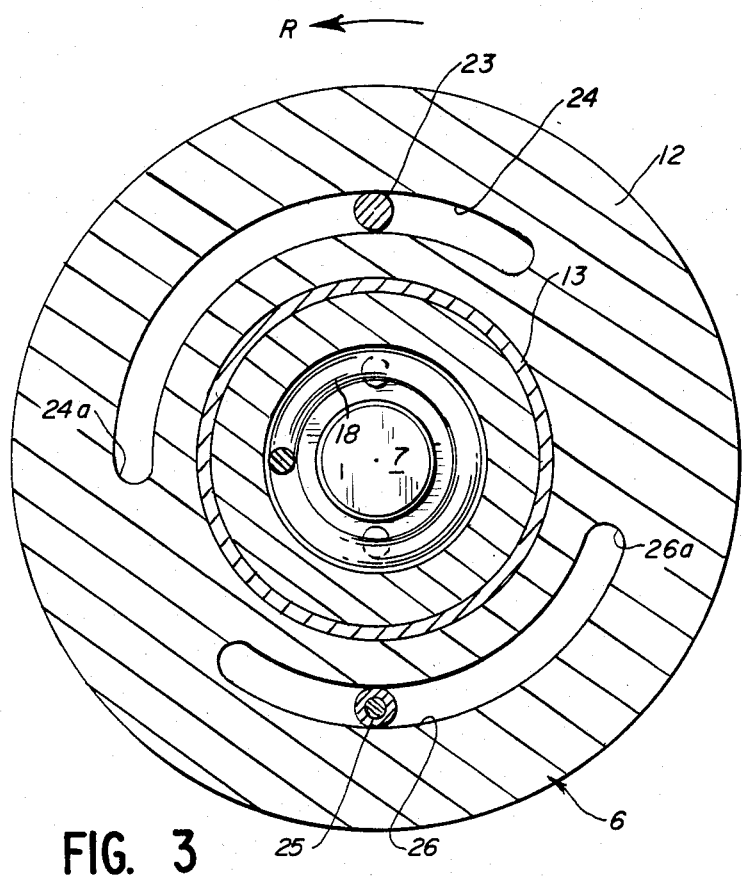
FIG. 3
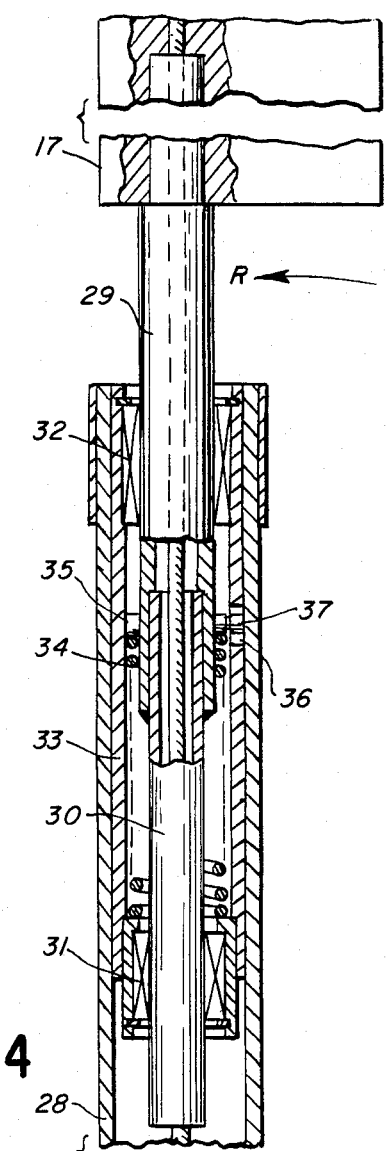
FIG. 4
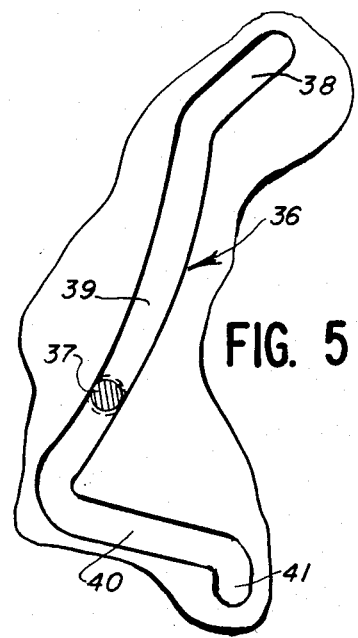
FIG. 5
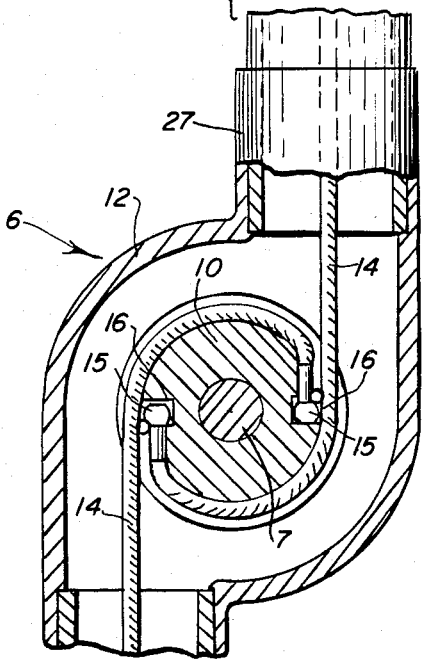

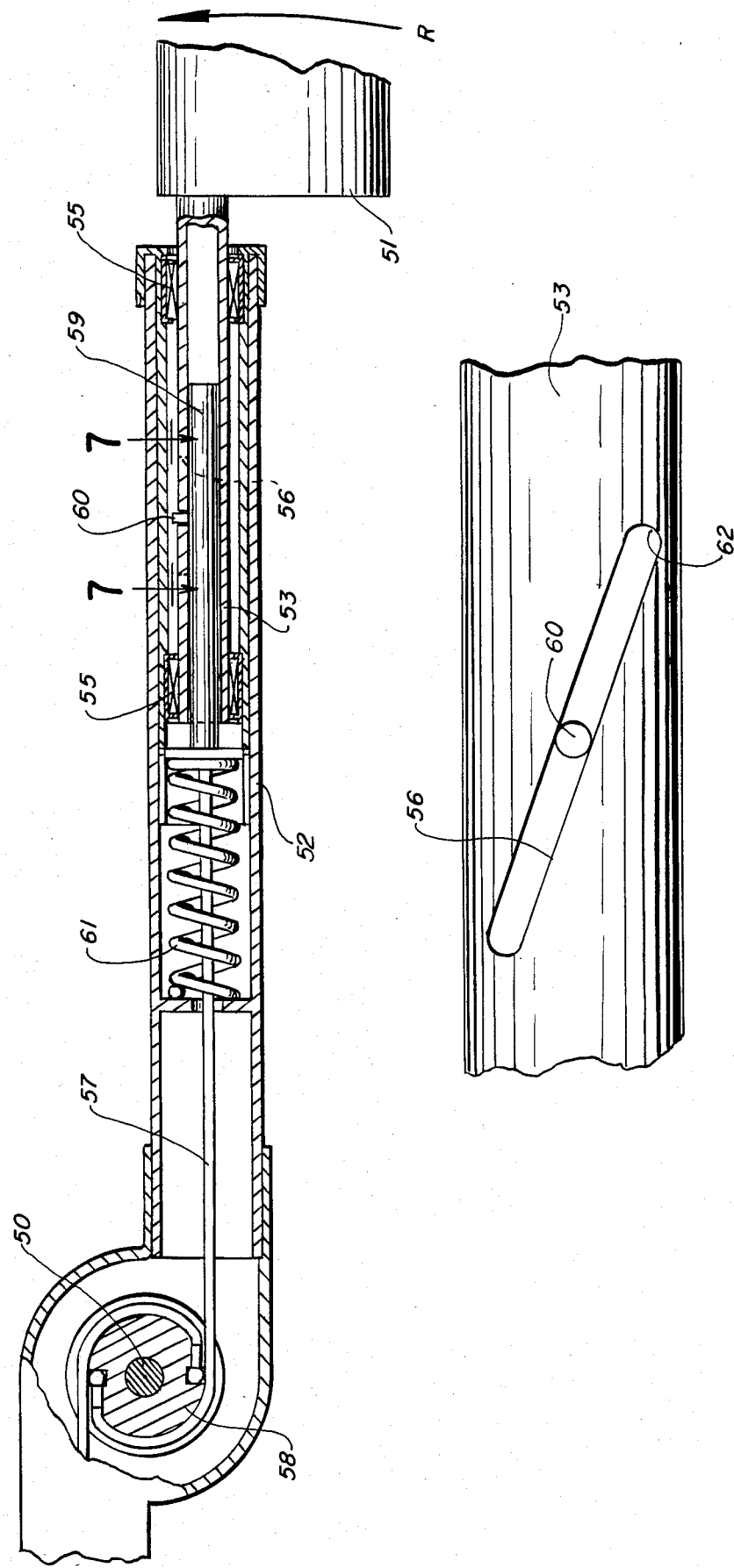

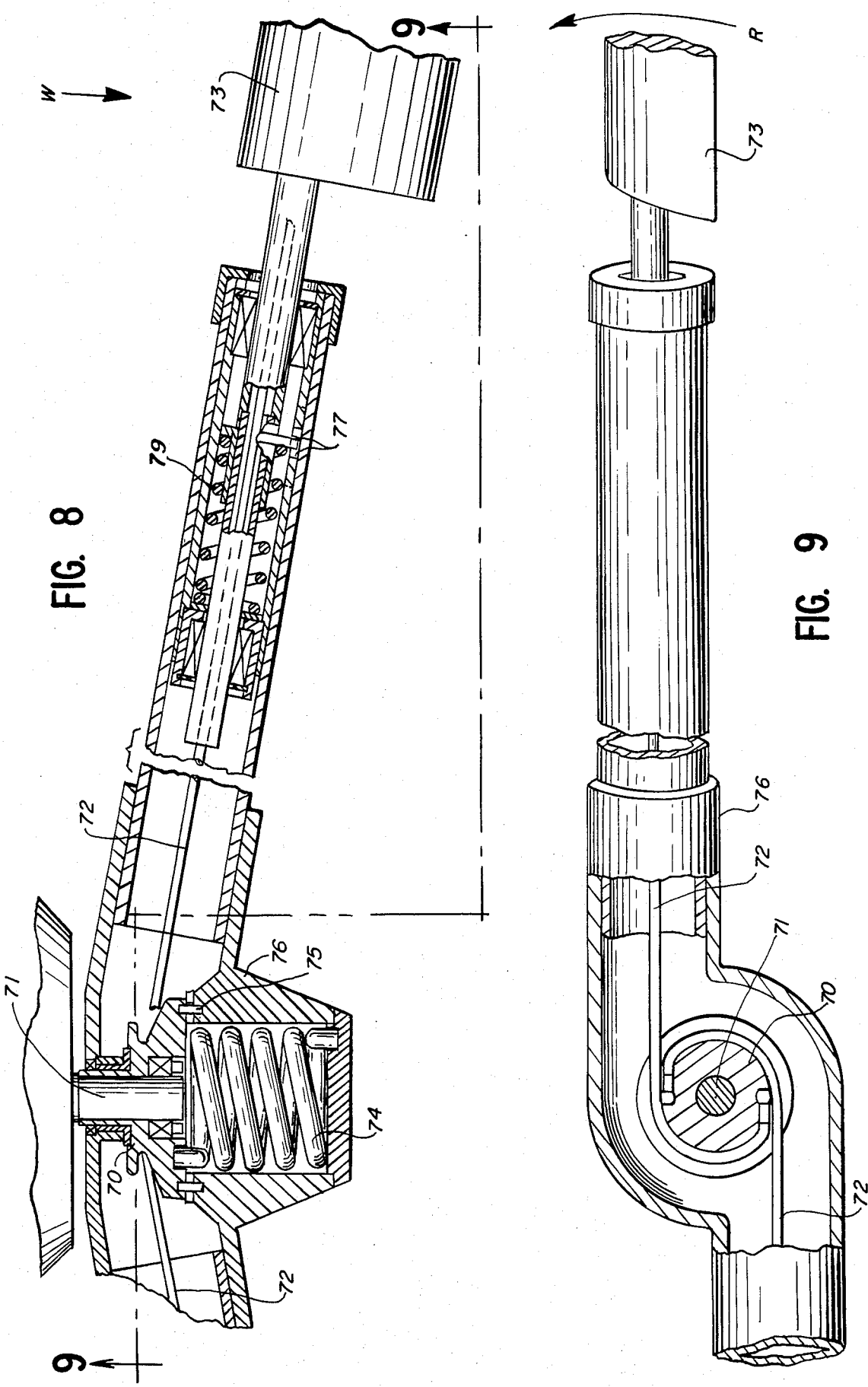

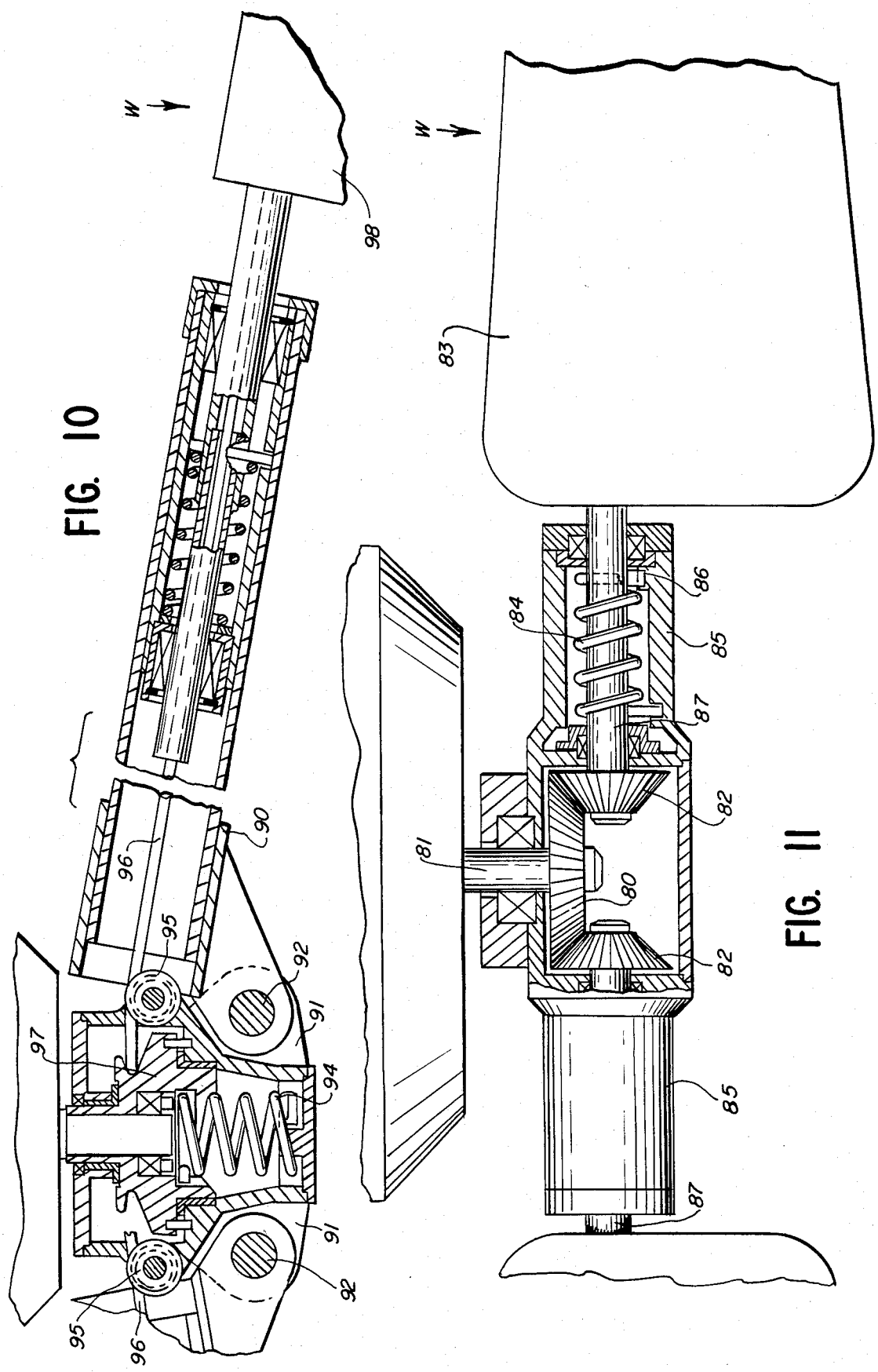

WIND ENERGY CONVERSION SYSTEM

TECHNICAL FIELD OF THE INVENTION

This invention relates to wind energy conversion systems and in particular to such systems having variable pitching blades.

BACKGROUND OF THE INVENTION

In wind energy conversion systems, such as in a wind powered generator construction, the rotation of a wind driven rotor will act, usually through a transmission, to drive a generator to generate electrical power or will be otherwise used to produce work.

Wind energy conversion systems that generate alternating current power by direct synchronous connection to the power line, using either a synchronous or induction generator, are designed to operate most efficiently at a substantially constant rotor speed. These systems require very precise and rapid control of blade pitch when the torque developed by the rotor reaches the design limit for the wind system. Substantial difficulty has been experienced in the past in providing adequate torque and speed control for this type of system.

In the past, rotor torque and speed control methods have generally been of three types, (i) fluid or electrically actuated pitch control systems, (ii) mechanical pitch adjusting systems, and (iii) other means of limiting rotor behavior without active pitch control.

Control systems of the first type, of which U.S. Pat. No. 4,160,170 is illustrative, are generally used to control blade pitch for horizontal axis, constant speed rotors and usually function to regulate generated power. These control systems may also have additional functions, as for example, setting the blade pitch for rapid start-up and feathering the blades for rotor shut-down at excessively high wind speeds. While such pitch control systems are readily applied to control of generated power, they suffer from a number of shortcomings which limit their use generally to large and expensive wind systems. Electrically actuated systems are highly complex, requiring wind velocity sensors, averaging circuits and the like, and may have low reliability, slow control rates, and high cost. Generally speaking, control systems having fluid actuation provide more rapid control than electrical actuation, but suffer from either greater complexity or less precise control.

U.S. Pat. Nos. 2,666,149, 4,006,925 and 4,066,911 illustrate various types of mechanical pitch control mechanisms. Mechanical systems of various types have been widely used to provide partial limiting of rotor speed, but do not directly control power and, as such, are not suitable for use with modern constant speed rotors.

A fixed pitch, constant speed rotor is an example of a third type of rotor control. In such devices power output is intrinsically determined by aerodynamic stall of the blades at high wind speed. Shortcomings of this type of control include exceptionally high structural loads, poor power control and potentially undesirable noise and vibration.

SUMMARY OF THE INVENTION

This invention is directed to a wind energy conversion system having a wind driven rotor construction for providing relatively uniform power generation, as by a generator or other power transfer device driven by a drive shaft. A rotor assembly having at least one rotor blade is coupled to the drive shaft by torque control means for driving the shaft and is supported for rotational movement relative to the drive shaft about the axis of the shaft. The drive shaft is provided with means for coupling the drive shaft to power output means, such as an electric generator. The torque control means couples the shaft and rotor both for driving the shaft in response to rotor assembly rotation and for permitting relative rotation of the rotor assembly about the shaft axis for automatically changing the pitch of the rotor blades as the rotor assembly rotates relative to the drive shaft. Preferably the permitted relative rotation of the rotor assembly and the drive shaft is limited.

Thus, as applied to a wind driven apparatus, the invention provides a simple mechanical means for direct control of wind turbine power or torque by rapidly and automatically varying the pitch and/or the radial positions of the rotor blades without complicated electrical or mechanical control systems.

More specifically, the invention comprises a supporting structure and a substantially constant speed generator preferably mounted on the supporting structure. A drive shaft for driving the generator is provided. A rotor assembly is mounted for rotation with respect to the supporting structure and includes at least one wind responsive element, such as an elongated rotor blade. In one form of the invention, a portion of each rotor blade is mounted for sliding, generally radial movement with respect to the rotor assembly.

The device preferably includes speed regulating means operatively connected to the drive shaft to regulate the speed at which the drive shaft may rotate. The effect of the speed regulation is to provide a reacting torque in opposition to a speed increase in a predetermined manner. Hence, if the rotor torque increases beyond the desired shaft torque, the blade pitch is automatically changed to reduce rotor torque to a level equal to the desired shaft torque.

The rotor assembly is supported for rotational movement relative to the shaft about the axis of the shaft, and in one embodiment the shaft mounts a pulley and the rotor assembly is mounted to rotate relative to the pulley and shaft. The shaft and rotor assembly are interconnected, such that the rotor assembly may drive the drive shaft as it rotates and may automatically change the pitch of the blade as the rotor assembly rotates relative to the shaft about the axis of the shaft. In one embodiment of the invention a plurality of connecting members, such as cables, have one end of each secured to the movable portion of each blade and the opposite end of each member wound on the pulley, so that rotation of the rotor blades is transmitted through the members to the pulley and hence to the drive shaft.

To vary the pitch of each blade, a cam mechanism may interconnect each blade and the rotor hub. In one form of the invention, the cam mechanism includes a contoured cam slot formed in the rotor hub assembly and a follower carried by the blade. With this cam mechanism, radial movement of the blade will cause the blade orientation to change and will therefore simultaneously result in a change in the pitch of the blade.

In one embodiment, a system of springs, or other biasing means, may also be associated with the rotor blades. One of the springs urges each rotor blade radially outward, while another spring urges the rotor blades radially inward. The spring forces are arranged to achieve a balanced condition to provide each rotor blade with a given radial position and pitch under non-rotating conditions.

With this construction of this embodiment of the invention, initial rotation of the rotor blades under the force of the wind causes the blades to move outwardly due to centrifugal force, thereby to decrease the pitch through operation of the cam mechanism, so that the rotor blades will have a predetermined selected pitch in accordance with the cam slot.

At full power generating conditions, acceleration of the rotor assembly to a speed somewhat in excess of the speed at which it is desired to drive the coupled, interconnected drive shaft, such as due to an increase in wind velocity, will cause the cables to wind up on the pulley and will draw the blades radially inwardly to increase the pitch, thereby to reduce the torque applied to the shaft, thereby maintaining the energy output of the rotor assembly at a substantially constant value. It is to be understood that the wind-up of the cables results from the regulation of the torque to which the shaft will respond. As such the shaft will rotate only up to a maximum speed. When that speed is reached proportional increases in the torque generated by the rotor assembly will not increase the rotational speed of the drive shaft. At that time the cables will wind-up about the pulley, changing the pitch, hence the speed of rotation of the rotor assembly at a given wind velocity, resulting in a reduction of rotor torque. Conversely, deceleration of the blades due to a decrease in wind velocity will cause the cables to unwind and the blades to move radially outwardly, thereby to decrease the pitch, again maintaining the optimum power generation.

An automatic blade feathering feature for shutdown in the case of loss of rotor speed control, is preferably incorporated in wind powered devices of this invention. Under normal conditions, stops are provided to limit the extreme positions of the blades. However, in the event of excessive rotor speeds, the stop is rendered ineffective thereby to enable the cam mechanism to move the blades to a feathered position for shut-down.

As the pitch control is transmitted to the blades by linkages such as those described, a variety of hinged blade and rotor hub connections may be employed to great benefit. If the blade is hinged to the rotor hub, with the hinge point being offset from the transmission point of the flexible linkage, a differential pitch control is established, which provides for unequal pitch of the blades. This may be desirable to stabilize rotor motion and mitigate undesirable vibrations by automatically compensating for wind shear, for localized wind gusts, and for minor errors in rotor symmetry. In a similar fashion, the rotor hub may be hinged to its supporting connection to the shaft through use of a flexible connection or hinge joint.

With wind powered devices of this invention, kinetic energy is momentarily stored by the rotor as the blade pitch is increased in an increasing wind. The amount of energy thus stored may be related to the chosen contour of the cam slot, the blade construction, and the resultant blade radial displacement in the wind change. This energy storage characteristic allows power output to remain steadily controlled despite rapidly changing and gusting wind conditions.

The cables, or other members, which connect the blade with the shaft or pulley provide a dual function. They not only serve to transmit rotation of the rotor to the shaft and to couple the rotor to the shaft, but also serve as a safety device to prevent the blade from being thrown outwardly by centrifugal force, such as if the blade fractures.

The torque control mechanism of this invention provides for modular design and simplifies assembly. Unlike complex prior art devices, the wind powered devices of this invention do not require any electrical or hydraulic connections and all of the adjustments to the operating members may be made at the manufacturing plant so that no major adjustments are required at the place of installation. This greatly simplifies installation of such units.

Other objects, features and advantages will appear from the following description and drawings.

DESCRIPTION OF THE DRAWINGS

FIG. 3 is a section taken substantially along line 3—3 of FIG. 2;

FIG. 4 is an enlarged longitudinal section taken substantially along line 4—4 of FIG. 2;

FIG. 5 is a schematic representation in a single plane, of a cam slot of the wind powered device of FIGS. 1–4;

FIG. 6 is a schematic view similar to FIG. 4 of a further embodiment of this invention;

FIG. 7 is a view of the cam slot of FIG. 6 taken on line 7—7 thereof;

FIG. 8 is a fragmentary schematic view of another embodiment of this invention;

FIG. 9 is a view taken substantially in the direction 9—9 of FIG. 8;

FIG. 10 illustrates a further embodiment, similar to that of FIGS. 1–5; and

FIG. 11 is a fragmentary view of yet another embodiment of this invention.

DESCRIPTION OF THE ILLUSTRATED EMBODIMENTS

Figures 1, 2:
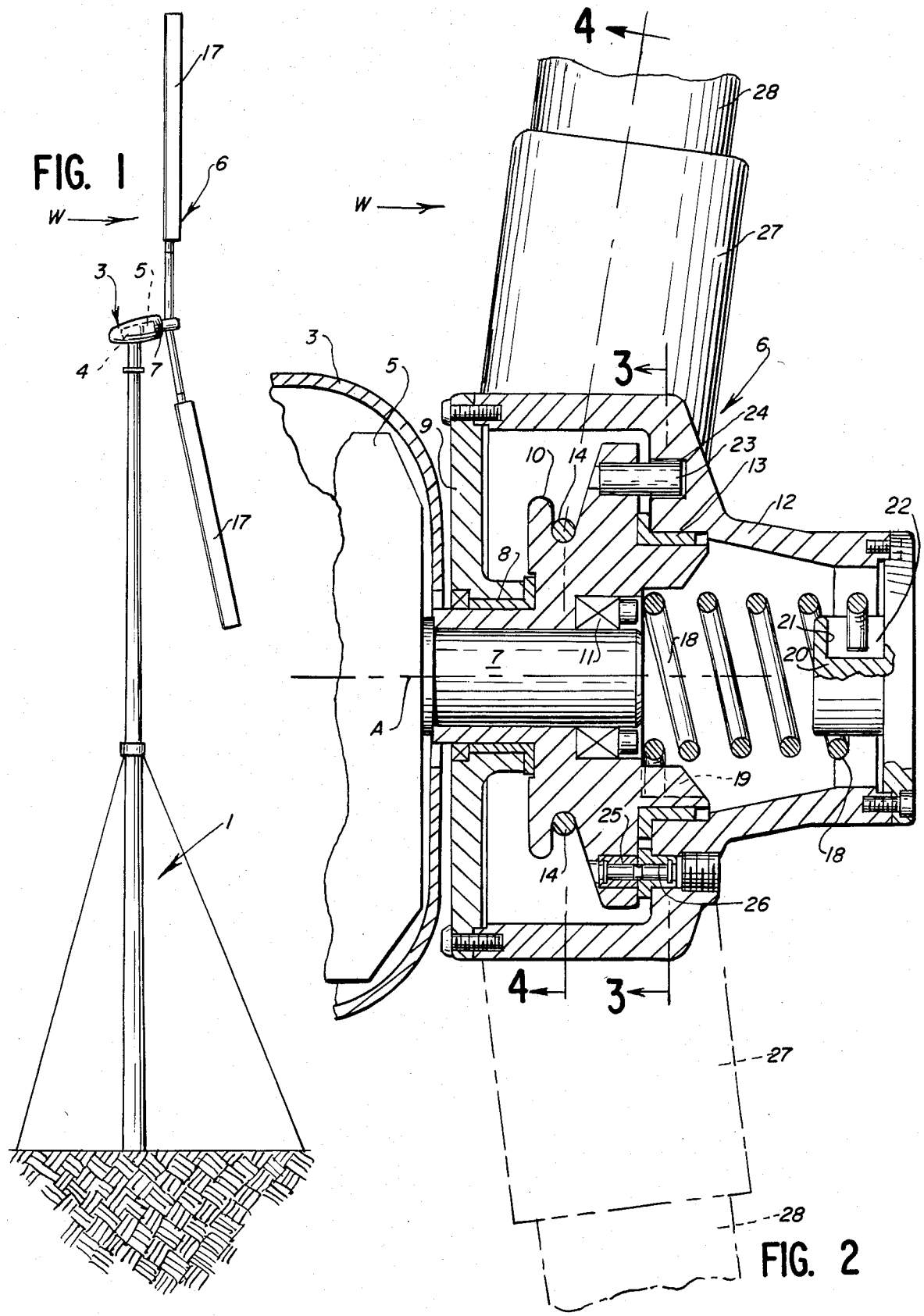
FIG. 1 is a side elevational view of a wind powered device of the present invention.
FIG. 2 is a longitudinal section showing a portion of the torque control mechanism of the wind powered device of FIG. 1.

The drawings illustrate wind powered devices incorporating torque control mechanisms of the present invention.

In the embodiment of FIGS. 1–5, the wind powered device comprises a vertical support structure 1, the lower end of which is secured to a foundation or the ground, and the upper end of which carries a housing or frame portion 3 which is rotatable about a vertical axis. Although a downstream wind device is shown in this and other illustrated embodiments, the principles of this invention apply to upstream wind devices as well. Wind direction is shown as W in FIGS. 1 and 2. A power output means such as a generator 4, preferably an electric generator of an induction or synchronous type which operates at a substantially constant speed, is disposed within the housing 3 together with a suitable speed-increasing gear box 5. Although the power output means may be an electric generator, it may also be a mechanical or other device of a known type.

A rotor assembly 6 which rotates in direction R, which may include a hub portion and a pair of wind responsive elements such as elongated rotor blades 17, is mounted for rotation with respect to the housing 3. Rotation of the rotor assembly is transmitted via a torque control mechanism of the invention to be described to a drive shaft 7 which is suitably connected in a known manner through gear box 5 to the generator 4.

As best illustrated in FIG. 2, rotor 6 is journalled with respect to the drive shaft 7 by bearings 8 and 13, which are located between a pulley 10 and a flange on end wall 9 of the rotor and outer wall 12 respectively. A rotatable member or pulley 10 is non-rotatably secured, as to the outer end of the drive shaft 7, through suitable locking means such as expansion ring 11. With this construction, the pulley 10 is secured to the drive shaft 7, and the rotor 6 can, under predetermined operating conditions, rotate relative to and about the common axis A of the pulley 10 and the shaft 7. The pulley 10, depending upon the characteristics desired, may have a variable radius or may be otherwise shaped rather than being essentially round as illustrated.

As best illustrated in FIG. 4, a pair of blade pitching linkage means comprising coupling, connecting members such as cables 14 are partially wound on the pulley 10. The inner end of each cable is provided with an enlargement 15 which is secured within a notch 16 in the pulley, as by a suitable lock pin, while the outer end of each cable is connected to a rotor blade 17. The pulley 10 is biased in a direction to wind the cables on the pulley, as by a torsion spring 18. As shown in FIG. 2, one end of the torsion spring is secured in a notch 19 in the pulley, while the opposite end of the torsion spring borders a boss 20 on the end wall 22 of the rotor and is engaged within a slot 21 in boss 20. The force of the torsion spring 18 acts to rotate or bias the rotor counterclockwise, as shown in FIG. 4, to wind the cables 14 on the pulley 10.

Each of the cables 14 extends outwardly through a rotor hub arm 27 which is formed integrally with the rotor wall assembly. The outer end of each cable 14 extends to and is attached, such as to the outer extremity of the associated blade 17.

The amount of relative rotation of the rotor assembly 6 relative to the shaft 7 and pulley which is permitted is within a limited range. For that purpose, a pin 23 is mounted on the pulley 10 and is disposed for movement in a curved or arcuate slot 24 formed in the face of the rotor outer wall 12, as shown in FIG. 3. Similarly, a second pin, a shear pin 25, extends outwardly from the pulley and is disposed for movement within the curved slot 26 in the confronting face of outer wall 12.

The configuration of slots 24 and 26 is best shown in FIG. 3. When the rotor assembly is at rest, the pins 23 and 25 will be at a location intermediate the ends of the respective slots 24 and 26. Under optimum power generating conditions, the pins will move within the central portions of the slots. Under extreme, excessive conditions of rotor rotation i.e., greatly excessive speed, the shear pin 25 will engage the end 26a of the slot 26 and the shear pin 25 will fracture, permitting the rotor assembly to rotate even farther in that direction. This action will bring about automatic feathering of the rotor blades in a manner that will be more fully described. Due to the configuration of the slots 24 and 26, the shear pin 25 will engage the slot end 26a before pin 23 will contact the slot end 24a. After fracture of shear pin 25, further rotation of the shaft and pulley will move stop pin 23 into engagement with slot end 24a to hold the pulley and rotor in that relative relationship until the rotor has slowed to an idling condition.

The outer end of each rotor arm 27 is fixally connected to an extension tube 28. A sleeve 33 is disposed and fixed within the extension tube 28. A shaft assembly, connected to each blade 17, is provided and each shaft assembly includes an outer shaft member 29 and an inner shaft member 30. The shaft assembly is mounted for sliding movement within sleeve 33. To facilitate such relative sliding movement, the shaft member 30 is mounted for sliding movement within a bushing 31, while the outer shaft member 29 is mounted for sliding movement within the bushing 32. Bushings 31 and 32 are suitably secured to the inner surface of the sleeve 33.

An associated shaft assembly and blade are biased outwardly of sleeve 33 by a compression spring 34 which acts in opposition to the torsion spring 18. One end of the spring 34 bears against a housing of the bushing 31, while the opposite end of spring 34 engages a ring 35 which is secured, as by screws, to the outer surface of the shaft member 29. With this construction, the force of spring 34 acts against the ring 35 to urge the associated rotor blade 17 outwardly.

As stated, the force of spring 34 acts in opposition to the force of the torsion spring 18, and the several springs 34 (one for each rotor blade 17) and 18 are designed so that a desired balanced condition is achieved under non-rotational conditions, i.e., the blades are maintained in their desired positions, at the same desired pitch and restrained against the force of gravity when the rotor is at rest. Torsion spring 18, because it acts on all blades, tends to prevent oscillation in pitch as the rotor 6 rotates.

In accordance with the embodiment of FIGS. 1–5, as the blades 17 move radially, the pitch of the blades is automatically changed, via a cam slot and follower arrangement wherein the cam slot is associated with one of the rotor assembly and blade, and the follower is associated with the other. To that end, the sleeve 33 is provided with a cam slot 36. A pin or cam follower 37 is attached to the outer shaft member 29 and rides within the cam slot. The configuration of the cam slot can be best seen in FIG. 5, which is a schematic view of the slot in a single plane. The slot includes an end section 38, an elongated central section 39 communicating with one end of end section 38, and a reverse section 40 which terminates in an end 41. The cam slot and follower arrangement may vary, and may embody, for example, a helical spline or mechanical linkage mechanisms.

When the rotor and associated blades are at rest, the springs 18 and 34 will provide a balanced condition in which the follower 37 is in the central section 39 of the cam slot as shown in FIG. 5. In this position, blade 17 may be disposed with a preselected pitch of say about 20°. At that balanced position of rest, the tension in the cables 14 must also exceed the weight of the blades 17, so that when a blade is in a vertically upright position, the blade will not fall by gravity causing the cable to slacken.

As the rotor assembly is rotated in response to wind, the centrifugal force of the blades 17 will tend to move the blades outwardly against the springs with respect to the extension tube 28 and will therefore automatically decrease the pitch of the blades until the pitch is at a predetermined pitch, say about 1° with a wind speed of approximately 6 mph. With wind speeds of from 6 mph to approximately 12 mph, the generator 4 is automatically connected in the line by a conventional switching mechanism (not shown), and at a speed of about 12 mph full rated power is achieved.

When the rotor assembly is at rest, the tension in the cables 14 is the result of the combined and balanced forces of torsion spring 18 and compression springs 34. When the rotor assembly is turning, the tension in the cables is determined by the centrifugal force of the blades 17 combined with the forces of springs 18 and 34. The forces of the springs 18 and 34 are selected and balanced appropriately, inter alia, to set the start-up pitch positions of the blades 17. Under constant running conditions their resultant spring forces, combined with the centrifugal force, act to produce a preselected tension in the cables.

When the wind-force reaches the level at which the wind device has been designed to produce maximum power, the preselected cable tension acts on the pulley, hence on the drive shaft. At that time, the maximum design torque is available to act on the drive shaft. That torque is measured by the cable tension times the effective pulley radius. The preselected torque may be varied by changing the effective radius of the pulley. For example, in the embodiment illustrated, the pulley radius has been selected to produce an optimum or maximum of four kilowatts.

It will be apparent from the foregoing that the rotor assembly 6 is coupled to and interconnected with the drive shaft and drives the drive shaft through cables 14 and pulley 10 which form part of the torque control means of this embodiment of the present invention. However, as the torque of the rotor assembly attempts to increase above shaft torque, the shaft and rotor torques will be out of balance and the rotor assembly will rotate relative to the shaft axis about the shaft axis, thereby automatically changing the pitch of the blades via movement of cam follower 37 in cam slot 36.

If, at rated power conditions, the rotor assembly accelerates further due to an increase in wind velocity, the torque generated by the rotor will exceed the torque of the drive shaft 7. The torque on the drive shaft is related to an external speed regulating means which, in the present embodiment, is a synchronously operated generator, such as, for example, a three phase induction motor wired in T-connection as is known in the art to produce single phase power. The maximum shaft reaction torque that may be sustained from the generator is limited by the collective product of available tensions in the cables 14 and their respective effective pulley radii. When connected to an external alternating current power source, such as the electric grid of a local utility, the generator will thereby be limited in its rotational speed. If connected to a 60 Hz. utility power source, the generator will then rotate only at such a speed as to produce 60 Hz. electric power. This provides speed regulation for the drive shaft.

An appropriate speed sensing means can be operably associated with the shaft 7 to measure its rotational speed. The speed sensing means is then operably associated with a control means which connects the generator to utility power only when the rotor assembly has reached operating speed. When the rotor assembly reaches an excessive speed as due to extremely high winds, the generator is disconnected from utility power and the blades feather as discussed below.

Alternatively the speed regulating means may be a constant speed shaft load. It may also be a mechanical, pneumatic, hydraulic, magnetic, electronic or electrical device which functions to limit the rotational speed at which the shaft is permitted to rotate. It may be a means which acts directly on the drive shaft, as a mechanical braking device might, or may produce a signal which energizes a braking device or the like. For example, a sensor of power production in excess of the design power might be used to energize a limiting device which would act to limit shaft speed, hence to activate the torque control mechanism. It is also clear that speed regulation may occur at a fixed maximum speed or may occur gradually over a pre-selected range of speeds or power outputs. As the desired limit of the rotational speed of the rotor is reached, and the rotor attempts to rotate faster than the shaft, the cables 14 will begin to wind up on the pulley 10 and will immediatly draw the blades 17 radially inwardly. That will automatically increase the pitch of the blades, thereby to reduce the torque on the rotor assembly and to maintain the rated power output. On the other hand, if there is a deceleration of the rotor due to a decrease in wind velocity, the cables will unwind and the blades will automatically move radially outwardly to decrease their pitch, and to increase exposure of the blades to the wind, thereby to increase rotor torque. Thus, the mechanism acts to maintain the rated power generating conditions under variations in wind velocity by balancing the torque of the rotor and the shaft by winding and unwinding the cables, thereby to maintain power output at a relatively constant value.

A safety mechanism is incorporated which, under extreme high wind conditions, will automatically feather the blades 17 if rotor speed control is lost. In excessive rotor speed conditions the shear pin 25 will engage the end 26a of the slot 26, causing it to shear, thereby withdrawing the stop for outward movement of the blade. Further outward movement of the blade will move the follower 37 into the reverse section 40 of the cam slot 36, causing the blade to move to a feathered condition. Feathering could also be accomplished by reversing the direction of slot section 40 in which case feathering would be achieved by reverse feather with the trailing edge of the blade facing upstream.

This mechanism provides a safety feature under extreme conditions and is not automatically returnable, which means that when the shear pin 25 shears and the blade is feathered, it is necessary to replace the shear pin and to reset the follower 37 in the normal operating central portion 39 of the cam slot 36. It is readily apparent that in the present embodiment, disconnection of the generator from the line or other loss of electrical load would in itself cause loss of speed control unless an appropriate conventional backup control is provided, such as a brake. The above safety mechanism is intended to take effect only if such usual backup means has failed.

As will appear, therefore, the automatic pitch control mechanism of this invention will set the blades at their start-up pitch, will reduce the pitch as the blades begin to rotate, will hold the blades at a constant pitch from thence to full power (as at 12 mph), will adjust the pitch automatically to maintain constant generator output above maximum full power wind speed, will store energy from gusts of wind to prevent power fluctuation and will feather the rotor blades during high winds or in the event of rotor overspeed.

A further embodiment of the wind powered device of the present invention is shown in FIG. 6. In this embodiment a blade 51 is mounted by the rotor hub such that, while movable to change its pitch, the blade does not move radially with respect to rotor hub arm 52. The blade 51 is mounted on a shaft assembly 53 which is rotatably received within hub arm 52 and is mounted for rotation, but restrained from radial movement, by suitable bearings 55. Shaft assembly 53 defines a camming slot 56 of a configuration which is shown in FIG.

7. A cable 57 extends from a drive shaft pulley 58 to a radially, but not rotationally, movable rod 59 mounting a cam follower 60. Follower 60 is disposed in slot 56. Rod 59 is biased in an outwardly direction, as by a compression spring 61.

As in the embodiment of FIGS. 1-5, as the torque of the rotor assembly changes with respect to the torque on the shaft 50, cable 57 appropriately winds or unwinds on the shaft pulley 58. As cable 57 is wound onto pulley 58, rod 59 moves radially and cam follower 60 moves within camming slot 56 automatically to change the pitch of the blades. In this embodiment, conventional means for startup and overspeed shutdown independent of the pitch control mechanism of this invention are employed. In all other respects the structure of the embodiment of FIGS. 6 and 7 may be the same as that of FIGS. 1-5, except that such elements as the torsion spring and shear pin are not used.

Before the rotor begins to rotate, cam follower 60 is at end 62 of slot 56. This sets the pitch of the blades at a substantially flat angle, say at 1 or 2 degrees. As the rotor begins to revolve, cam follower 60 remains at end 62 until a full power condition as described in connection with the embodiment of FIGS. 1-5 is reached. The cable 57 then begins to wind on shaft pulley 58, pulling rod 59 radially inwardly at which time cam follower 60 moves within the slot 56 to increase the pitch of the blades. As before, this action equalizes the torque of the rotor and the torque of the shaft 50.

A further alternative embodiment is shown in FIGS. 8 and 9 wherein each rotor blade moves outwardly in response to an increase in rotor torque. As before, pulley 70 is fixedly secured to a shaft 71 having a cable 72 extending to blade 73. Unlike the prior embodiments, the winding of the cable 72 with respect to the pulley 70 is in a direction opposite to the direction of blade rotation R. In the embodiment of FIGS. 8 and 9, the radial position of blade 73 is regulated by the torque induced to torsion spring 74. When the rotor torque exceeds the shaft torque the rotor and blades 73 move ahead of the shaft 71 in the direction of rotation R. As the blades 73 move ahead of shaft pulley 70, cable 72 is unwound causing blades 73 to be moved radially outwardly and their pitch is adjusted by a camming mechanism 77 like to that of the embodiment of FIGS. 1-5. In this embodiment there is an additional advantage, because as the blades reach an overspeed condition, they are moved outwardly and their moment of inertia is increased. This increase in moment of inertia contributes to the slowing of the rotation of the rotor.

Before the blades 73 begin to rotate, they are in their closed position relative to the pulley 70, with a suitable stop means, such as stop 75 engaging the end of a slot in the hub outer wall 76, analogous to the configuration of FIG. 3. In this position, the blades 73 have a start-up pitch of about 20 degrees. Compression spring 79 opposes torsion spring 74 during start-up to provide a proper relationship between rotor speed and pitch during start-up. As the blades 73 begin to turn, centrifugal force causes them to move outward relative to the shaft 71. When wind speed reaches about 12 mph, the blade pitch is a desired amount, say about one degree. As in the embodiment of FIGS. 1-5, as the rotor reaches an overspeed condition, i.e., develops excessive torque, the cable unwinds and blade pitch is increased, and the rotor torque reduces, thereby to rebalance the torques of the shaft and rotor. If shaft torque is lost, as for example by loss of power on the electrical utility line or due to extreme high wind conditions, the rotor will accelerate allowing the blades to move outwardly by centrifugal force, causing the blade pitch to increase until the rotor achieves a safe, idling condition at a somewhat higher rotational speed. Thus this embodiment includes an especially simple and effective means for rotor overspeed protection.

FIG. 10 shows a structure for the rotor which can be used with any of the former embodiments described. This structure is designed to accomplish what is known in the art as the Delta 3 effect which compensates for imbalances among several rotor blades. Imbalance can be caused by an elevational difference in wind velocity, by a rotor tracking error or by inconsistencies in the structure of the blades, among other things. In this case, the rotor includes a rotor arm 90 tiltably mounted on rotor hub 91 by hinge 92. The amount of tilt for the rotor arm 90 with respect to the hub 91 is controlled, as by stop pins in a manner known in the art.

A cable system similar to the embodiment of FIGS. 1-5 is shown in FIG. 10. To accommodate the use of a cable, a small auxiliary pulley 95 is provided to direct the cable 96 to the shaft pulley 97. In operation, the rotor arm 90 and associated blade 98 may move forward and rearward in response to an imbalance among the blades, thereby reducing vibration and other effects induced by imbalance. With this structure, the pitch of the several blades may be adjusted individually, within predetermined limits, while, of course, the torque control mechanism otherwise serves to match shaft torque and rotor torque, as in the manner previously described.

Yet another embodiment is shown in FIG. 11. In this embodiment, a shaft bevel gear 80 is mounted on the drive shaft 81. A blade bevel gear 82 affixed to one end of a rotor blade 83 is in mesh with shaft bevel gear 80. The rotational position of blade 83 is controlled by a torsion spring 84 which biases the blade with respect to rotor hub 85 which suitably journals the blade shaft 87. In this embodiment, when the torque on the rotor exceeds the biasing of spring 84, and the rotor attempts to run ahead of the shaft, blade bevel gear 82 rotates in mesh with bevel gear 80 and the pitch of the blade is adjusted accordingly. Similarly, when the torque of the rotor falls below the biasing torque of spring 84, the pitch of the blade is adjusted as to restore the rotor to maximum torque. The spring is selected for the particular power output desired.

In operation, the blades 83 begin at a substantially flat pitch, of say about 1 or 2 degrees. As the rotor and blades 83 begin to rotate, the blades are rotatively fixed by the opposing action of springs 84 and stops 86, until a full power condition is reached. A further increase in rotor speed causes the rotor to turn forward relative to the shaft 81 and gear 80, thus increasing pitch to control generator power at the desired maximum value. Thus, as can be seen from FIG. 11, the rotor blades are coupled to the drive shaft 81 and are mounted for driving the shaft in response to rotation of the rotor assembly and further for automatically changing the pitch of the blades as the rotor assembly rotates relative to the shaft about the axis of the shaft.

As used in the claims, the term rotor blade embraces portions of a rotor blade and other wind responsive rotor elements, the disposition or pitch of which may be varied in accordance with the principles of the invention to alter rotor torque. Thus, such rotor blades include blade elements of the type illustrated, sail elements, drag buckets and others.

Although several embodiments have been described it will be apparent to those skilled in the art that further modifications may be made without departing from the spirit and scope of the present invention. Accordingly, I intend to be limited only insofar as may be made necessary by the appended claims.

What is claimed is:

1. A wind powered device comprising:
a support structure
a drive shaft mounted for rotation about its axis with respect to the support structure,
speed regulating means operatively connected to said drive shaft to regulate the speed at which said drive shaft may rotate,
a rotor assembly mounted on said drive shaft for rotational movement with respect to said drive shaft about the axis of said drive shaft and for rotation with respect to said support structure, said rotor assembly comprising at least one rotor blade, and
torque control means carried by said rotor assembly coupling said drive shaft and said rotor assembly for driving said drive shaft in response to rotation of said rotor assembly and for automatically changing the pitch of the blade as said rotor assembly rotates relative to said drive shaft about the axis of said drive shaft.

2. A wind powered device in accordance with claim 1 further comprising speed regulating means operatively connected to said drive shaft to regulate the speed at which said drive shaft may rotate.

3. A wind powered device in accordance with claim 1 further comprising power output means coupled to said coupling means.

4. A wind powered device in accordance with claim 1 in which said power output means is an electric generator.

5. A wind powered device in accordance with claim 1 further comprising means limiting the extent to which said rotor assembly may move relative to said drive shaft about the axis of said drive shaft and for automatically feathering said blades.

6. The wind powered device of claim 1 wherein the rotor assembly further comprises a rotor hub mounted for rotation with respect to the support structure and said drive shaft, and wherein said rotor blade is mounted on the rotor hub for movement with respect to said hub.

7. The wind powered device of claim 6 wherein said torque control means includes blade pitching linkage connected to the blade for changing the pitch of the blade as said linkage is moved relative to the rotor hub, and means mounted on the drive shaft for moving the linkage relative to the rotor hub in a first direction when the torque of the rotor exceeds the torque of the drive shaft and the rotor moves relative to said drive shaft in the direction of rotor rotation, and for moving the linkage relative to the rotor hub in a second opposite direction when the torque of the drive shaft exceeds the torque of the rotor and the drive shaft moves relative to the rotor in the direction of rotor rotation.

8. The wind powered device of claim 1 wherein the speed regulating means is a synchronously connected generator.

9. The wind powered device of claim 1 wherein said rotor blade is mounted to move radially with respect to said drive shaft and the torque control means includes a pulley mounted on said shaft and a cable having one end fixed to said pulley and the other end connected to the blade for moving the blade radially with respect to said drive shaft, whereby when the rotor torque and shaft torque are out of balance, the rotor moves about the axis of the drive shaft and said cable winds or unwinds about said pulley automatically to change the pitch of the blade.

10. The wind powered device of claim 1 wherein the torque control means includes pulley means mounted on said drive shaft and a cable having one end fixed to said pulley means and the other end connected to means for changing the pitch of the blade whereby when the rotor torque and shaft torque are out of balance, the rotor moves about the axis of the drive shaft and the cable winds or unwinds about the pulley means automatically to change the pitch of the blade.

11. The wind powered device of claim 10 wherein said cable increases the pitch of the blade as the blade is moved radially toward the drive shaft in response to an increase in rotor torque.

12. The wind powered device of claim 9 including biasing means between the rotor assembly and pulley acting to wind the cable about the pulley when the wind powered device is at rest, and wherein said cable is mounted to increase the pitch of the blade as the blade is moved radially outwardly from the drive shaft in response to an increase in rotor torque.

13. The wind powered device of claim 6 wherein said rotor blade is mounted to move radially with respect to said drive shaft and wherein the torque control means includes means defining a cam slot fixed with respect to one of said rotor hub and said blade and a cam follower fixed with respect to the other of said rotor hub and said blade, whereby as said follower moves with respect to said slot, the pitch of said blades is automatically changed.

14. The wind powered device of claim 13 wherein said cam slot defining means is fixed with respect to said rotor hub.

15. A wind turbine rotor construction, comprising a supporting structure, a generator carried by the supporting structure and including a drive shaft, a rotor including at least one generally elongated radially extending rotor blade mounted for rotation with respect to said supporting structure, said rotor and rotor blade being mounted for movement relative to said drive shaft and about the axis of said drive shaft, torque control means carried by the rotor and coupling said rotor and said drive shaft for transmitting rotation from said rotor to said drive shaft, means responsive to an acceleration in speed of said rotor under optimum power generating conditions due to an increase in wind velocity to rotate said rotor assembly relative to said shaft thereby to increase the pitch of the blade, and means responsive to a deceleration in the speed of said rotor under said optimum power generating conditions due to a decrease in wind velocity to rotate the rotor assembly relative to said drive shaft thereby to decrease the pitch of the blade, thereby maintaining optimum power generation under variations in wind velocity.

16. A wind turbine rotor construction in accordance with claim 15, further comprising speed regulating means operatively connected to said shaft to regulate the speed at which said shaft may rotate.

17. A wind turbine rotor construction in accordance with claim 15 wherein said rotor blade is also mounted for generally radial movement whereby when said rotor accelerates under optimum power generating conditions, said coupling means moves said blade radially to increase the pitch of the blade and when said rotor decelerates in response to a decrease in wind velocity, said coupling means moves said blade radially to decrease the pitch of the blade.

18. A wind turbine rotor construction in accordance with claim 17 wherein said coupling means moves said blade radially outwardly in response to deceleration and radially inwardly in response to acceleration.

19. The wind turbine rotor construction of claim 20, and including first biasing means for urging the blade radially outwardly, and second biasing means for urging the blade radially inwardly, said first and second biasing means being arranged to achieve a balanced condition to provide the rotor blade with a preselected pitch in a condition of rotor non-rotation.

20. The wind turbine rotor construction of claim 17, wherein said means for varying the pitch of the rotor blade comprises cam means interconnecting the rotor and the rotor blade.

21. The wind turbine rotor construction of claim 20, wherein said cam means comprises a generally curved cam member extending longitudinally of said blade.

22. The wind turbine rotor construction of claim 17, wherein said drive shaft mounts a pulley and said coupling means includes a cable adapted to be wound and unwound about said pulley.

23. The wind turbine rotor construction of claim 22, further including means for limiting the amount of relative rotation of said rotor with respect to said shaft about the axis of said shaft.

24. The wind rotation rotor construction of claim 17, further including means for automatically feathering the rotor blade in the event of loss of rotor speed control.

25. The wind turbine rotor construction of claim 17, further including means for pivoting the rotor blade with respect to the rotor for movement of said blade in a fore and aft direction.

26. A wind powered device comprising:
a support structure,
power output means,
a drive shaft mounted for rotation about its axis with respect to the support structure, and means for coupling said drive shaft to the power output means,
a rotor assembly mounted on said support structure for rotation with respect to said support structure, said rotor assembly comprising at least one rotor blade, and means supporting said rotor assembly for rotational movement relative to said drive shaft about the axis of said shaft, and
torque control means including a drive shaft bevel gear mounted on the drive shaft in mesh with a blade bevel gear operably connected to the rotor blade for changing the pitch of the blade as the blade bevel gear is rotated, such that when the rotor torque and shaft torque are out of balance the rotor blade moves with respect to the drive shaft about the axis of said drive shaft, and said bevel gears automatically change the pitch of said blade.

27. A wind powered device comprising:
a support structure,
a drive shaft mounted for rotation about its axis with respect to the support structure, and means for coupling said drive shaft to power output means,
a rotor assembly mounted on said support structure for rotation with respect to said support structure, said rotor assembly comprising at least one rotor blade for movement radially with respect to the shaft as the rotor assembly rotates with respect to the shaft, a compression spring urging said blade radially outwardly relative to said drive shaft axis, and means supporting said rotor assembly for rotational movement relative to said drive shaft about the axis of said shaft, and
torque control means including a torsion spring having one end fixed relative to said rotor assembly and the other end fixed relative to said drive shaft for driving said drive shaft in response to rotation of said rotor assembly and for automatically changing the pitch of the blade as said rotor assembly rotates relative to said drive shaft about the axis of said drive shaft.

28. A wind powered device in accordance with claim 27 further comprising a speed regulating means operably connected to said drive shaft to regulate the speed at which said drive shaft may rotate.

29. A wind powered device in accordance with claim 28 wherein the speed regulating means is a synchronously connected generator.

30. A wind powered device in accordance with claim 1 wherein the torque control means also balances the torque on the shaft and the torque produced by the rotor assembly with the centrifugal force produced by at least a portion of the rotor assembly.

31. A wind powered device comprising:
a support structure,
power output means,
a drive shaft mounted for rotation about its axis with respect to the support structure,
means for coupling the drive shaft to power output means,
means for generating a preselected torque which remains substantially constant under running conditions of the device, said means including a rotor assembly mounted for rotation with respect to the support structure, the rotor assembly comprising at least one rotor blade mounted on a rotor hub, and means supporting the rotor assembly for rotational movement relative to the drive shaft about the axis of the shaft, and
torque control means coupling the drive shaft and the rotor assembly for balancing the torques produced by the means for generating a preselected torque, and the torque on the shaft; the torque control means driving the drive shaft in response to rotation of the rotor assembly and automatically changing the pitch of the blade as the rotor assembly rotates relative to the drive shaft about the axis of the drive shaft.

32. The wind powered device of claim 31 wherein the means for generating a preselected torque includes a moveable member mounted for radial movement with respect to the shaft, said moveable member generating a centrifugal force under running conditions of the device.

33. The wind powered device of claim 32 wherein the blade is radially fixed relative to the rotor hub and the moveable member is a moveable rod mounted for radial movement relative to the rotor hub.

34. The wind powered device of claim 32 wherein the moveable member includes the blade, the blade being mounted for radial movement relative to the drive shaft.

35. The wind powered device of claim 34 wherein the torque control means includes a rotatable member fixed on the drive shaft and a connecting member between the rotatable member and the blade.

36. The wind powered device of claim 35 wherein the blade is mounted for radial movements at a rate relative to the hub that is a function of the position of the rotor assembly relative to the shaft which varies with the position of the rotor assembly relative to the shaft.

37. The wind powered device of claim 36 wherein the rotatable member is a variable radius pulley.

38. The wind powered device of claim 31 wherein said power output means comprises a synchronously operated generator.

39. A wind powered device comprising:
a support structure,
a drive shaft mounted for rotation about its axis with respect to the support structure;
speed regulating means operatively connected to the drive shaft to regulate the speed at which the drive shaft may rotate;
a rotor assembly comprising at least one rotor blade, and means supporting the rotor assembly for rotational movement relative to the drive shaft about the axis of the shaft, the blade being mounted to move radially with respect to the shaft as the rotor assembly rotates relative to the drive shaft, and
torque control means coupling the drive shaft and the rotor assembly for driving the drive shaft in response to rotation of the rotor assembly and for automatically changing the pitch of the blade as the blade moves radially with respect to the shaft.

40. The wind powered device of claim 39 wherein as the torque on rotor assembly exceeds the torque on the shaft, the blade is moved radially inward toward the shaft, and as the torque on the shaft exceeds the torque on the rotor assembly, the blade is moved radially outward from the shaft.

41. The wind powered device of claim 40 wherein the speed regulating means is a synchronously operated generator.

42. A wind powered device comprising:
a synchronously operated generator,
a drive shaft coupled to the generator,
a rotor hub mounted for rotation relative to the drive shaft,
a rotor blade mounted on the rotor hub for radial movement with respect to the drive shaft,
means for changing the pitch of the rotor blade as the blade is moved radially with respect to the drive shaft,
a rotatable member fixed on the drive shaft, and
a connecting member interconnecting the rotatable member and the blade such that as the torque generated by the blade exceeds the torque on the shaft, the blade is moved radially inward toward the drive shaft, and as the torque on the drive shaft exceeds the torque generated by the blade, the blade is moved radially outward from the drive shaft.

43. The wind powered device of claim 42 including biasing means interconnecting the drive shaft and the rotor hub.

44. The wind powered device of claim 42 wherein the rate of movement of the blade relative to the hub as a function of the position of the rotor assembly relative to the shaft varies with the position of the rotor assembly relative to the shaft.

45. The wind powered device of claim 42 including a spring biasing the blade toward the drive shaft.

* * * * *